DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JANUARY 1, 1974

918 O.G. 104

T918,006

METHOD OF SECURING STACKED POLYOLEFIN CONTAINERS AGAINST SLIPPING

James N. Schramm, 12342 Brookshire 70815; and Carroll J. Macalusa, 8295 Bontura Court 70808, both of Baton Rouge, La.; and Robert C. Schumann, Jr., 65 Willow Court, Lake Jackson, Tex. 77566

Filed May 7, 1973, Ser. No. 358,189

Int. Cl. C08f *3/22*

U.S. Cl. 117—94

No Drawing. 5 Pages Specification

A method of securing stacked substantially rigid, self-supporting polyolefin containers such as pails, bottles and the like against slippage comprising applying a lacquer coating to adjacent contacting portions, such as contacting outer rims of such containers, said lacquer coating consisting essentially of an organic solvent, such as the aromatic hydrocarbons toluene and xylene or chlorinated aliphatic hydrocarbons such as trichloroethylene and ketones such as methyl ethyl ketone, having dissolved or dispersed therein a substantially linear chlorinated polyethylene which contains from about 25 to 50 and preferably from about 36 to 48 weight percent of chemically combined chlorine and has a relative crystallinity of between about 15 and 28 percent when containing about 25 weight percent chlorine and a relative crystallinity of less than about 10 percent when containing about 34 weight percent chlorine; wherein the dried residue of the lacquer coating provides a slip angle between the adjacent contacting surfaces of such containers of between about 10 and 50 degrees, such slip angle being determined by raising one end of the platform on which such containers are supported and determining the angle from the horizontal when the uppermost container commences to slide or move.